United States Patent [19]

Yogo et al.

[11] Patent Number: 4,969,696
[45] Date of Patent: Nov. 13, 1990

[54] ANTI-SKID CONTROL SYSTEM FOR USE IN MOTOR VEHICLE

[75] Inventors: Kazutoshi Yogo; Hideo Wakata, both of Nagoya; Kenshi Saito, Handa, all of Japan

[73] Assignee: Nippondenso Co., Ltd., Kariya, Japan

[21] Appl. No.: 379,248

[22] Filed: Jul. 13, 1989

[30] Foreign Application Priority Data

Jul. 13, 1988 [JP] Japan .................................. 63-174266
Sep. 7, 1988 [JP] Japan .................................. 63-224043

[51] Int. Cl.⁵ .......................... B60T 8/00; B60T 8/68
[52] U.S. Cl. ................................... 303/109; 303/108; 303/116
[58] Field of Search ................ 303/97, 107, 109, 113, 303/116, 108, 61, 119

[56] References Cited

U.S. PATENT DOCUMENTS

| | | | |
|---|---|---|---|
| 3,637,264 | 1/1972 | Leiber et al. | 303/105 |
| 3,880,474 | 4/1975 | Scharlack | 303/109 X |
| 3,953,083 | 4/1976 | Latvala et al. | 303/100 |
| 4,099,793 | 7/1978 | Iio | 303/116 |
| 4,611,859 | 9/1986 | Otsuki et al. | 303/116 X |
| 4,749,239 | 6/1988 | Onogi et al. | 303/95 |
| 4,800,498 | 1/1989 | Matsui et al. | 303/100 X |
| 4,807,941 | 2/1989 | Onogi et al. | 303/108 |

Primary Examiner—Robert P. Olszewski
Assistant Examiner—A. Muratori
Attorney, Agent, or Firm—Cushman, Darby & Cushman

[57] ABSTRACT

An anti-skid control system for use in a motor vehicle includes a two-position type control valve for performing increase and decrease in the braking pressure supplied to a wheel braking cylinder for braking a wheel of the motor vehicle. The control valve is operated in accordance with a signal indicative of a duty ratio from an electronic control unit. The electronic control unit estimates a balanced duty ratio whereby the current braking pressure in the wheel braking cylinder is maintained as it is and determines the duty ratio on the basis of the estimated balanced duty ratio in accordance with the locking state of the wheel.

13 Claims, 9 Drawing Sheets

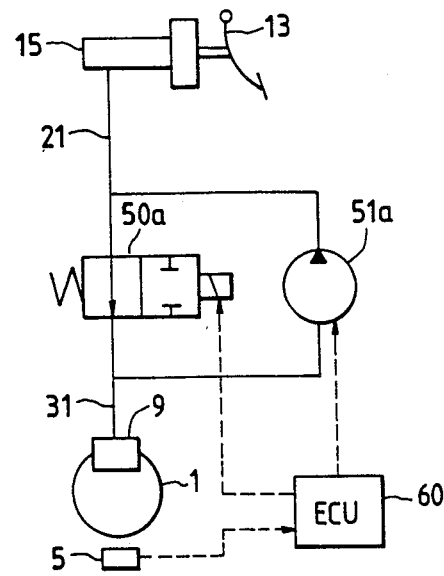
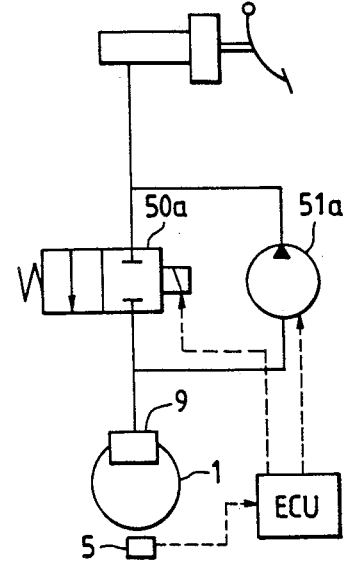
FIG. 2A
FIG. 2B
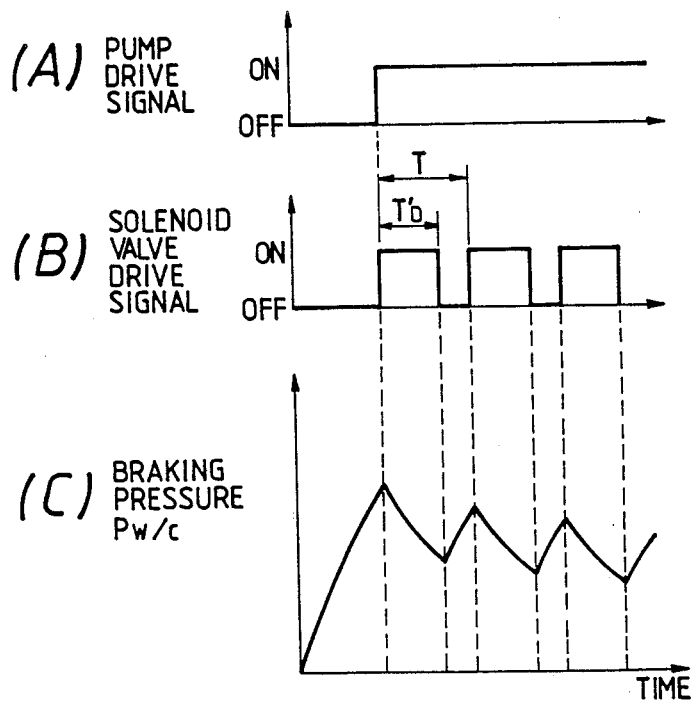
FIG. 3

ANTI-SKID CONTROL SYSTEM FOR USE IN MOTOR VEHICLE

BACKGROUND OF THE INVENTION

The present invention relates generally to anti-skid control systems for use in motor vehicles, and more particularly to such an anti-skid control system arranged so as to adjust the pressure of a wheel braking cylinder by a pressure control valve to prevent a locking of a wheel which can occur when the motor vehicle is running.

Conventionally, an anti-skid control system is known as disclosed in Japanese Patent Publication No. 51-6308 (U.S. Pat. No. 3,637,264), the technique of which is arranged such that the braking pressure to the wheel braking cylinder is adjusted in accordance with duty control of a two-position valve between the pressure-increasing position and the pressure-decreasing position.

Generally, such an anti-skid control system controls the braking pressure to the wheel braking cylinder in accordance with predetermined duty ratios for low pressure-increasing operation, low pressure-decreasing operation and pressure-maintaining operation. However, the pressure-increasing and pressure-decreasing slopes developed when the two-position valve takes the pressure-increasing position and the pressure-decreasing position depend upon the braking pressure in the master cylinder, the braking pressure in the wheel braking cylinder and others. At this time, in the duty control of the two-position valve, a duty ratio exsits whereby the pressure-increasing amount obtained in accordance with the pressure-increasing slope can become equal to the pressure-decreasing amount obtained in accordance with the pressure-decreasing slope. This balanced duty ratio causes maintaining the braking pressure in the wheel braking cylinder to be constant. Accordingly, in the case of fixing the duty ratios in advance as disclosed in the aforementioned prior art, even if the two-position valve is operated with the duty ratio set for the slow pressure-increasing purpose, for example, when the duty ratio is greater than the balanced duty ratio, the braking pressure in the wheel braking cylinder results in being decreased, thereby making it difficult to reliably and surely control the increase and decrease in the braking pressure in the wheel braking cylinder.

SUMMARY OF THE INVENTION

It is therefore an object of the present invention to provide an anti-skid control system which is capable of reliably controlling the braking pressure in the wheel braking cylinder.

The anti-skid control system according to the present invention includes a wheel speed sensor for sensing the speed of a wheel of the motor vehicle and a control valve for controlling the braking pressure in a wheel braking cylinder which applies a braking force to the wheel. The control valve is of the two-position type that takes the pressure-increasing position and the pressure-decreasing position. Further, the control valve is arranged to be operable in accordance with a signal indicative of a duty ratio for determining the driving time relation between the pressure-increasing and the pressure-decreasing. Also included in the system is locking decision means for determining the locking state of the wheel on the basis of the wheel speed sensed by the wheel speed sensor and balanced duty ratio estimating means for estimating a balanced duty ratio whereby the present braking pressure in the wheel braking cylinder is kept as it is when the control valve is driven with a signal having the balanced duty ratio. The control means of the anti-skid control system determines a duty ratio on the basis of the estimated balanced duty ratio in accordance with the locking state of the wheel determined by the locking decision means and controls the control valve with a signal indicative of the determined duty ratio. The balanced duty ratio is estimated on the basis of the variation of the duty ratio which is in turn obtained in accordance with a wheel parameter. The wheel parameter is determined as a function of the wheel speed, wheel acceleration and vehicle acceleration.

BRIEF DESCRIPTION OF THE DRAWINGS

The object and features of the present invention will become more readily apparent from the following detailed description taken in conjunction with the accompanying drawings in which:

FIGS. 2A and 2B are illustrations of an arrangement of the FIG. 1 anti-skid control system with respect to one wheel of the motor vehicle;

FIG. 3 is a time chart for describing the operation of the first embodiment;

DETAILED DESCRIPTION OF THE INVENTION

Figure 1:
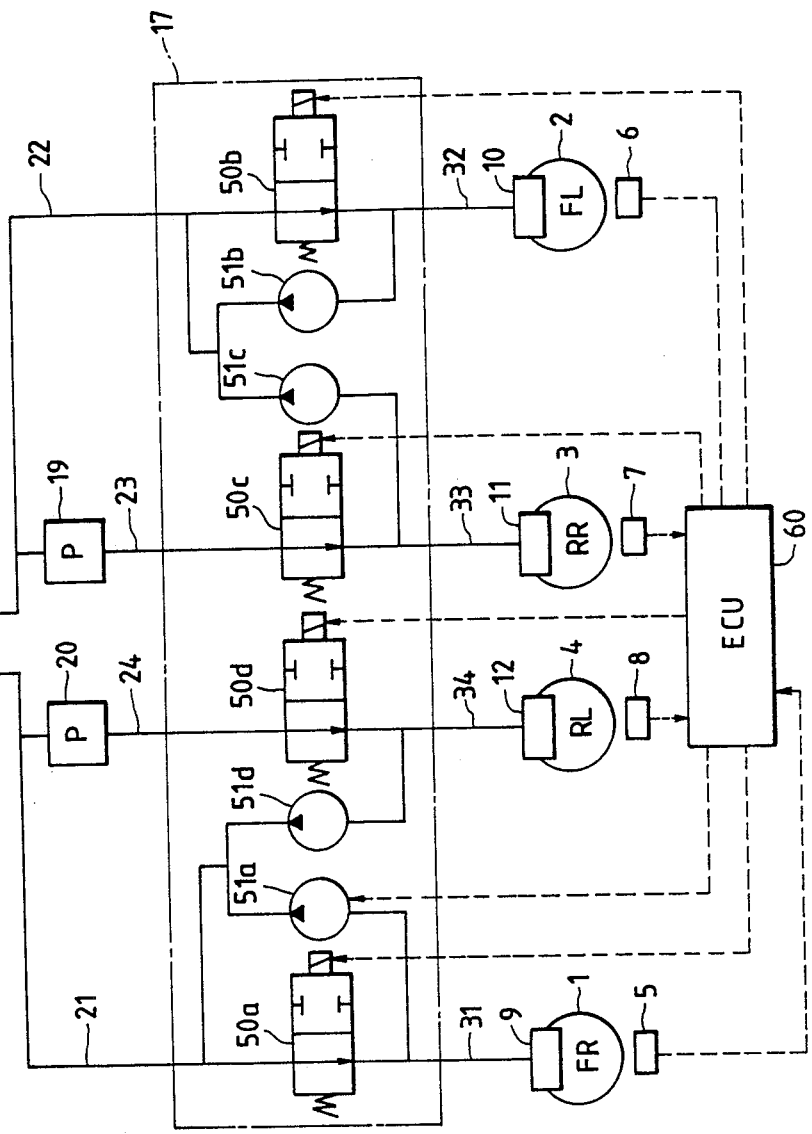
FIG. 1 is a diagram showing an arrangement of an anti-skid control system according to a first embodiment of the present invention which is incorporated into a motor vehicle.

Referring now to FIG. 1, there is schematically illustrated an anti-skid control system according to an embodiment of the present invention which is incorporated into a motor vehicle. In FIG. 1, front-right and front-left wheels 1 and 2 of the motor vehicle are respectively associated with wheel braking cylinders 9 and 10 for braking which are in turn coupled through solenoid-operated valves 50a and 50b, which are of the two-port and two-position type, to a master cylinder 15. Further, rear-right and rear-left wheels 3 and 4 are also associated with wheel braking cylinders 11 and 12 which are coupled through two-port and two-position solenoid-operated valves 50c and 50d and proportioning valves (P valves) 19 and 20 to the master cylinder 15. With these arrangements, the braking pressure generated due to depression of the master cylinder 15 is supplied to the respective wheel braking cylinders 9 to 12. Illustrated at numerals 31 to 34 are pipes disposed at the downstream sides of the respective solenoid-operated valves 50a to 50d and coupled to through pumps 51a to 51d to pipes 21 and 22 disposed at the upstream sides of the solenoid-operated valves 50a and 50b. These pumps 51a to 51d are driven by means of a single motor (not shown) which causes the braking liquid in the respective wheel braking cylinders 9 to 12 to return to the upstream sides of the solenoid-operated valves 50a and 50b for the front wheels 1, 2.

Also provided in the anti-skid control system are wheel speed sensors 5 to 8 for sensing the speeds of the respective wheels 1 to 4. The signals indicative of the sensed wheel speeds are supplied to an electronic control unit (ECU) 60 which determines the locking states of the respective wheels 1 to 4 on the basis of the signals therefrom. In accordance with the results of the determinations, the ECU 60 respectively duty-controls the solenoid-valves 50a to 50d and at the same time operates the non-illustrated motor so as to drive the pumps 51a to 51d.

FIGS. 2A and 2B are illustrations for describing the control for only one wheel (the front-right wheel 1).

(1) General Braking Operation

The solenoid-operated valve 50a takes a position illustrated in FIG. 2A so that the master cylinder are directly communicated with the wheel braking cylinder 5a, and further the pump 51a is in the non-driven state. Accordingly, the braking pressure of the master cylinder 15 developed in response to depression of a braking pedal 13 is directly operated with respect to the wheel braking cylinder 9 so as to apply the braking torque to the front-right wheel 1.

(2) Anti-Skid Control

Due to the braking operation taken when the motor vehicle is running, the degree of locking of the front-right wheel 1 becomes high, the ECU 60 starts the anti-skid control. In response to the start of the anti-skid control, the ECU 60 outputs a control signal, as shown by (A) in FIG. 3, to the non-illustrated motor so as to drive the pump 51a. The pump 51a is always in the driven state during the anti-skid control execution. In addition, as shown by (B) and (C) of FIG. 3, The ECU 60 duty-controls the solenoid-operated valve 50a to adjust the braking pressure Pw/c in the wheel braking cylinder 9. Here, when being in the deenergized state (OFF state), the solenoid-operated valve 50a takes the position illustrated in FIG. 2A, and in response to the energization (ON state), the solenoid-operated valve 50a takes the position illustrated in FIG. 2B.

One example of the anti-skid control executed in the ECU 60 will be described hereinbelow with reference to FIGS. 4 and 5.

Figure 4:
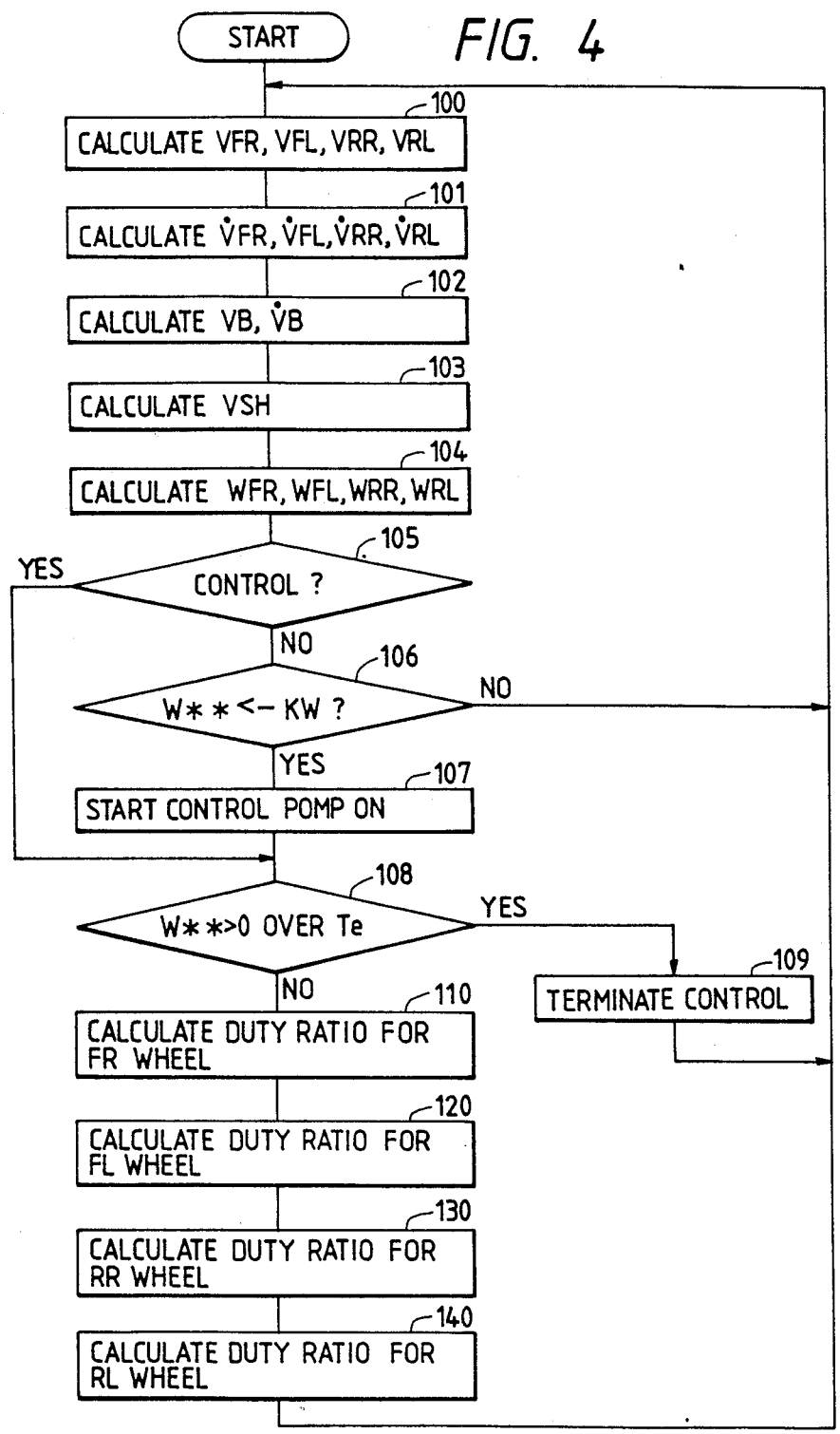
FIGS. 4 and 5 are flow charts for describing the anti-skid control according to the first embodiment.

In FIG. 4, the anti-skid control starts with a step 100 to calculate the respective wheel speeds (front-right wheel speed $V_{FR}$, front-left wheel speed $V_{FL}$, rear-right wheel speed $V_{RR}$ and rear-left wheel speed $V_{RL}$) on the basis of the wheel speed signals from the respective wheel speed sensors 5 to 8. A subsequently, a step 101 is executed so as to calculate the acceleration values $\dot{V}_{FR}$, $\dot{V}_{FL}$, $\dot{V}_{RR}$ and $\dot{V}_{RL}$ as a function of the respective wheel speed $V_{FR}$, $V_{FL}$, $V_{RR}$ and $V_{RL}$ obtained in the previous step 100. Then, control advances to a step 102 to calculate an estimated vehicle speed $V_B$ and an estimated vehicle acceleration $\dot{V}_B$ in accordance with the following equations.

$$V_{B(n)} = MED(V_{B(n-1)} - \alpha_1 \cdot ta, \; V_{wmax},$$

$$V_{B(n-1)} + \alpha_2 \cdot ta \quad \text{(a)}$$

$$V_{wmax} = MAX(V_{FR}, V_{FL}, V_{RR}, V_{RL}) \quad \text{(b)}$$

$$\dot{V}_B = (V_{B(n)} - V_{B(n-1)})/ta \quad \text{(c)}$$

where operator MED represents a median, operator MAX designates the maximum value, the subscript $(n)$ of $V_{B(n)}$ in the equation (a) depicts the present calculation value, the subscript $(n-1)$ denotes the previous calculation value, $\alpha_1$, $\alpha_2$ are the deceleration upper limit and the acceleration upper limit of the vehicle acceleration which are used to limit the speed difference between the previously calculated vehicle speed $V_{B(n-1)}$ and the currently calculated vehicle speed $V_{B(n)}$, and ta represents a period (for example, 4 to 10 msec.) for the calculation of the vehicle speed.

Returning to the flow chart of FIG. 4, control proceeds to a step 103 to determine a reference speed $V_{SH}$ on the basis of the calculated estimated vehicle speed $V_B$ in order to decide the wheel locking tendency. That is, the estimated vehicle speed $V_B$ is multiplied by Ko (=0.7 to 0.95) so as to obtain a speed corresponding to a target slip ratio and then the reference speed $V_{SH}$ is determined by subtracting an offset speed Vo from the target-slip-ratio-corresponding speed.

$$V_{SH} = Ko \, V_B - Vo \quad \text{(d)}$$

Here, the calculation that the offset speed Vo is subtracted from the speed Ko $V_B$ obtained by multiplying the estimated vehicle speed $V_B$ by Ko is for the purpose of setting the speed difference between the estimated speed $V_B$ and the reference speed $V_{SH}$ to be greater than the offset speed Vo even when the estimated vehicle speed $V_B$ becomes low.

In a step 104, a calculation is performed in accordance with the following equation so as to obtain parameters $W_{FR}$, $W_{FL}$, $W_{RR}$ and $W_{RL}$ indicative of locking tendencies (states) of the respective wheels (which will be referred to as wheel parameters) on the basis of the estimated vehicle acceleration $\dot{V}_B$ and the reference speed $V_{SH}$ calculated in the previous steps 102 and 103.

$$W_{} = A \cdot (V_{} - V_{SH}) + B \cdot (\dot{V}_{**} - \dot{V}_B) \quad \text{(e)}$$

where the symbol  of $W_{}$, $V_{**}$ and so on represents any one of FR, FL, RR and RL.

With respect to the wheel parameter $W_{}$ to be calculated in the equation (e), the case of $W_{} > 0$ indicates that the wheel does not enter into the locking state, and the case of $W_{} \leq 0$ represents that the wheel is in the locking state. $|W_{}|$ indicates the degree of the locking state. During the anti-skid control execution, when $W_{} > 0$, the braking pressures Pw/c in the wheel braking cylinders 9 to 13 stand increased. On the other hand, if $W_{} \leq 0$, it is under the pressure-maintaining or pressure-decreasing condition.

In a step 105, it is checked whether the anti-skid control has been started. If so, control goes to a step 106 to decide the locking tendency of each of the wheels. That is, the wheel parameters $W_{}$ of the respective wheels obtained in the above-mentioned step 104 is compared with a control start level $-Kw$ (Kw: positive constant). As a result, when the decision is made where at least one of the wheel parameters $W_{}$ is smaller than $-Kw$, control goes to a step 107 to start the anti-skid control. On the other hand, if in the step 106 all the wheel parameters $W_{FR}$ to $W_{RL}$ are above $-Kw$, the operational flow returns to the step 100 under the determination that all the wheel are not in the locking states. In the step 107, the pump 51a is driven to be in the ON state, thereby starting the anti-skid control.

A subsequent step 108 is provided in order to check whether the state that all the wheel parameters $W_{FR}$ to $W_{RL}$ are greater than zero continues for not-less-than Te seconds (for example, 0.5 to 2 seconds). If the answer of this step 108 is affirmative, control advances to a step 109 under the determination that the locking of the wheels are completely controlled. In the step 109, the pump 51a is set to the non-driven state (OFF state) and the solenoid-operated valve 50a is deenergized (set to the OFF state) whereby the anti-skid control is terminated so that the operational flow returns to the step 100. On the other hand, if in the step 108 the decision is negative, under the determination that the locking states of the respective wheels are not yet controlled perfectly, the anti-skid control is effected in the following steps 110 to 140.

In the steps 110 to 140, the duty ratios for driving the solenoid-operated valves 50a to 50d are calculated in accordance with the degrees of the locking states of the respective wheels 1 to 4. Thereafter, the operational flow returns to the step 100. With the calculated duty ratios, the respective solenoid-operated valves 50a to 50d are duty-controlled in the interrupt routine illustrated in (a) to (d) of FIG. 5. Here, as shown in FIG. 6, the phases of the duty-control of the solenoid-operated valves 50a to 50d are shifted by $\frac{1}{4}T$ where T corresponds to one cycle of the duty control. Thus, as compared with the case that the duty-control is performed under the condition of the same phase, the braking liquid emerging from the master cylinder 15 or vice versa becomes smooth, thereby resulting in reduction of kickback of the braking pedal 13 and others and improvement of the braking feeling.

Figure 7:
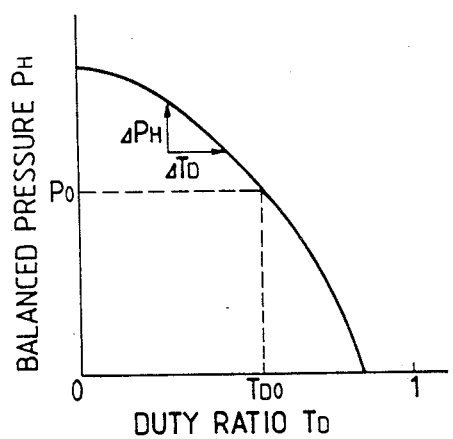
FIG. 7 is an illustration of the relation between the duty ratio and the balanced pressure in the first embodiment.

The calculation method of the duty ratio to be executed in the step 110 will be described hereinbelow with reference to FIGS. 3, 7 and 8.

With respect to the duty control of the solenoid-operated valve 50a, as illustrated by (B) of FIG. 3, as the energization timer period (pressure-decreasing time period) $T'_D$ of the one cycle T is longer, that is, in accordance with the duty ratio $T_D$ ($=T'_D/T$) becoming greater, the pressure-decreasing tendency becomes stronger. However, when the solenoid-operated valve 50a is continuously driven with a given duty ratio $T_D$, the braking pressure Pw/c in the wheel braking cylinder 9 is converged to a given pressure value (balanced pressure $P_H$). The duty ratio $T_D$ and the balanced pressure $P_H$ are in a relation to each other as shown in FIG. 7. Thus, in the cases where, for example, the solenoid-operated valve 50a is continuously operated with the duty ratio $T_{DO}$, the pressure-increasing is made when the braking pressure Pw/c in the wheel braking cylinder 9 is lower than the balanced pressure Po corresponding to the duty ratio $T_{DO}$, and on the other hand, the pressure-decreasing is made when the braking pressure Pw/c is higher than the balanced pressure Po. Thus, Even if the solenoid-operated valve 50a is operated in accordance with the duty ratio $T_{DO}$, the increase or decrease in the braking pressure Pw/c in the wheel braking cylinder 9 depends upon the current braking pressure Pw/c therein and others. Accordingly, in order to reliably perform the increasing and decreasing of the braking pressure Pw/c in the wheel braking cylinder 9, it may be preferable to estimate the balanced duty ratio $T_{MD}$ for maintaining the present braking pressure Pw/c in the wheel braking cylinder 9 and to operate the solenoid-operated valve 50a with a duty ratio $T_D$ smaller than the balanced duty ratio $T_{MD}$ when pressure-increased or a duty ratio $T_D$ greater than the balanced duty ratio $T_{MD}$ when pressure-decreased.

Here, an estimating method of the balanced duty ratio $T_{MD}$ will be described hereinbelow with reference to FIG. 8. In FIG. 8, let it be assumed that the solenoid-operated valve 50a is driven with the duty ratio $T_{DO}$ until a time to so that the braking pressure Pw/c in the wheel braking cylinder 9 reaches a balanced pressure Po. When at the time to the duty ratio is changed to $T_{D1}$ ($<T_{DO}$), the braking pressure Pw/c therein varies toward a balanced pressure P1 corresponding to the duty ratio $T_{D1}$ as shown in FIG. 8. At this time, the variation $\Delta P$ ($=Pw/c-Po$) is a function of time t and can be expressed as the following equation.

$$\Delta P = \Delta P1 \cdot (1 - e^{-k1(t-to)}) \tag{f}$$

where $\Delta P1 = P1 - Po$, and K1 is a positive constant.

Accordingly, the variation $\Delta P2$ of the braking pressure Pw/c after a calculation period ta (time t2) during which the ECU 60 estimates the balanced duty ratio $T_{MD}$ is given in accordance with the following equation.

$$\Delta P2 = \Delta P1 \cdot (1 - e^{-k1 \, ta}) = k \cdot \Delta P1 \, (0 < k < 1) \tag{g}$$

Here, when the variation $\Delta T_D$ of the duty ratio $T_D$ is small, the relation between the variation $\Delta T_D$ of the duty ratio $T_D$ and the variation $\Delta P_H$ of the balanced pressure $P_H$ of the wheel braking cylinder illustrated in FIG. 7 can be approximated as follows.

$$\Delta P_H = k2 \cdot \Delta T_D \text{ (k2 is a negative constant)} \tag{h}$$

Figure 8:
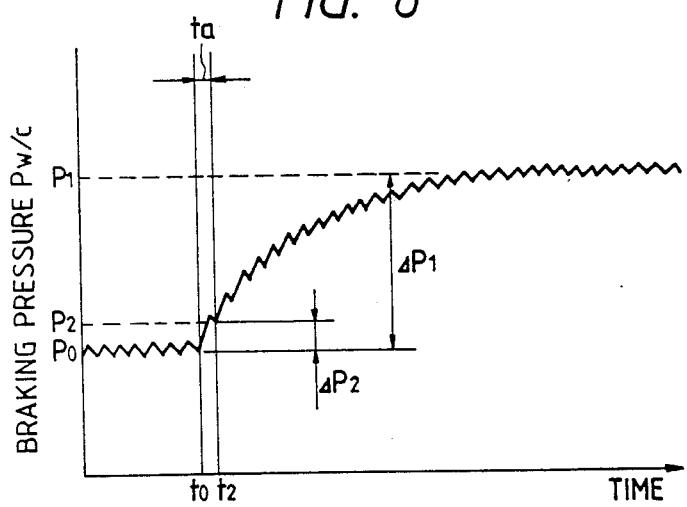
FIG. 8 is is a graphic diagram for describing a method of estimating the balanced duty ratio.

Thus, in the case of FIG. 8, $$\Delta P1 = k2 \cdot (T_{Do} - T_{D1}) = K2 \cdot \Delta T_{D1} \tag{i}$$

Further, when the duty ratio in the case that in FIG. 8 the braking pressure P2 is the balanced pressure is taken as $T_{D2}$, the following equation can be obtained.

$$\Delta P2 (= P2 - Po) = k2 \cdot (T_{Do} - T_{D2}) = k2 \cdot \Delta T_{D2} \tag{j}$$

When substituting the equations (i) and (j) into the equation (g), the resultant equation is as follows.

$$\Delta T_{D2} = k \cdot \Delta T_{D1} (\because 0 < k < 1) \tag{k}$$

That is, when the duty ratio is varied by $\Delta T_D$, the variation $\Delta T_{MD}$ of the balanced duty ratio after the calculation period tac can be obtained in accordance with the following equation.

$$\Delta T_{MD} = k \Delta T_D (0 < k < 1) \quad (1)$$

On the other hand, the duty ratio $T_{D}$ of each wheel can be calculated on the basis of the balanced duty ratio $T_{MD}$ and the variation $\Delta T_{D**}$ of the duty ratio in accordance with the following equation.

$$T_{D} = T_{MD(n-1)} - \Delta T_{D**} \quad (o)$$

where $T_{MD**(n-1)}$ is the previously calculated balanced duty ratio.

Further, the variation $\Delta T_{D}$ of the duty $T_{D}$ is given as follows on the basis of the wheel parameter $W_{**}$ calculated in the step 104 of the flow chart of FIG. 4.

$$\Delta T_{D} = k3 \cdot W_{} \quad (k3 \text{ is a positive constant}) \quad (m)$$

The balanced duty ratio $T_{MD(n)}$ to be used in the next calculation can be obtained in accordance with the following equation on the basis of the the variation $\Delta T_{D}$ of the duty ratio $T_{D}$ obtained by the equation (m) and the previously calculated balanced duty ratio $T_{MD(n-1)}$.

$$T_{MD(n)} = T_{MD(n-1)} - k \Delta T_{D**} (0 < k < 1) \quad (p)$$

If during the execution of the anti-skid control the balanced duty ratio $T_{MD}$ is always estimated in accordance with the aforementioned equation (p), it is possible to attain, in accordance with the equations (o) and (m), the duty ratio $T_{D**}$ which is capable of surely performing the pressure-increasing and pressure-decreasing of the braking pressure Pw/c of each of the wheels 1 to 4 in accordance with the locking state of each of the wheels 1 to 4.

Figure 9:
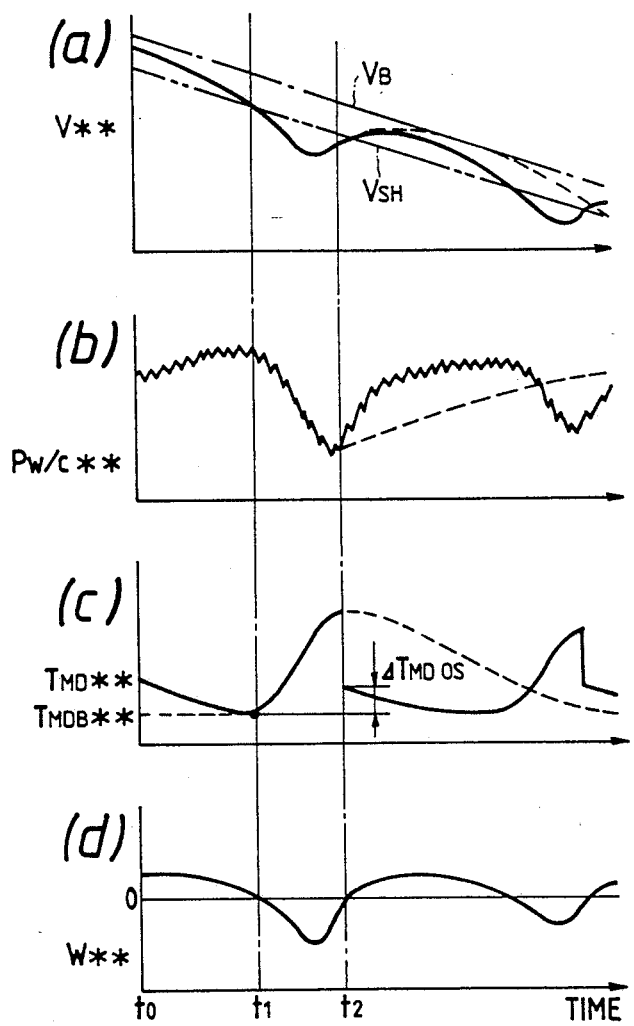
FIG. 9 is a time chart for describing a second embodiment of the present invention.

While in the steps 110 to 140 the duty ratio $T_{D}$ of each of the wheels 1 to 4 is calculated using the equations (m), (o) and (p), as a second embodiment of the present invention, further control is performed in order to improve the braking efficiency. A description will be described hereinbelow in terms of this control with reference to FIG. 9. As illustrated by (d) of FIG. 9, for the interval from time to to time t1, the wheel parameter $W_{}$ is greater than zero whereby the wheel is not in the locking state. Therefore, as illustrated by (c) of FIG. 9, the duty ratio $T_{D}$ and the balanced duty ratio $T_{MD}$ calculated in accordance with the equations (o) and (p) gradually become smaller, whereby the braking pressure Pw/c in the wheel braking cylinder is slowly increased as shown by (b) of FIG. 9. When, as illustrated by (a) and (d) of FIG. 9 the slip ratio is increased at the time t1 so that the wheel parameter $W_{}$ becomes below zero and hence the wheel enters into the locking tendency, the duty ratio $T_{D}$ and the balanced duty ratio $T_{MD}$ become greater in accordance with the value of the wheel parameter $W_{}$. As a result, the braking pressure Pw/c of the wheel braking cylinders is decreased so as to control the locking tendency of the wheel.

When at the time t2 the wheel parameter $W_{}$ again becomes greater than zero, the braking pressure Pw/c of the wheel braking cylinder starts to be increased. At this time, if the duty ratio $T_{D}$ and the balanced duty ratio $T_{MD}$ are calculated by the equations (o) and (p) using the value of the wheel parameter $W_{}$ obtained by the equation (e), as indicated by a dotted line in (c) of FIG. 9, the balanced duty ratio $T_{MD}$ is not lowered quickly. Thus, the duty ratio $T_{D}$ calculated on the basis of the balanced duty ratio $T_{MD**}$ is similarly decreased slowly. Accordingly, there is the possibility that as indicated by dotted lines in (a) and (b) of FIG. 9 the braking distance is lengthened due to lowering of the braking efficiency resulting from the delay of restoration of the braking pressure Pw/c of the wheel braking cylinder.

In order to eliminate this problem, according to this embodiment, the balanced duty ratio $T_{MDB}$ immediately before a start of the pressure-decreasing at the time t1 is stored in the memory and the balanced duty ratio $T_{MDB}$ at the time of a start of pressure-increasing, i.e., at the time t2, is determined to be a value obtained by adding the balanced duty ratio $T_{MDB}$ immediately before the start of the pressure-decreasing to an offset amount $\Delta T_{MDOS}$. With this determination, it is possible to quickly return the braking pressure Pw/c of each of the wheel braking cylinders 9 to 12 up to the optimum pressure determined by taking into account the braking efficiency. Here, the reason that the sum of the balanced duty ratio $T_{MDB}$ immediately before the start of the pressure-decreasing and an offset amount $\Delta T_{MDOS}$ is taken as the balanced duty ratio at the time of the start of the pressure-increasing is that it is considered that the optimal pressure determined by taking into account the braking efficiency is slightly lower than the balanced pressure $P_H$ corresponding to the balanced duty ratio $T_{MDB}$ immediately before the start of the pressure-decreasing. That is, the balanced duty ratio $T_{MD}$ is a value corresponding to the braking pressure Pw/c of each of the wheel braking cylinders 9 to 12, and at the time t1 the locking tendency occurs with respect to each of wheels 1 to 4 due to the braking pressure Pw/c corresponding to the balanced duty ratio $T_{MDB}$. Thus, the pressure slightly lower than the braking pressure Pw/c results in an optimal pressure, and the offset amount $\Delta T_{MDOS}$ is determined in order to the balanced duty ratio $T_{MD**}$ corresponding to the optimal pressure.

Figure 10:
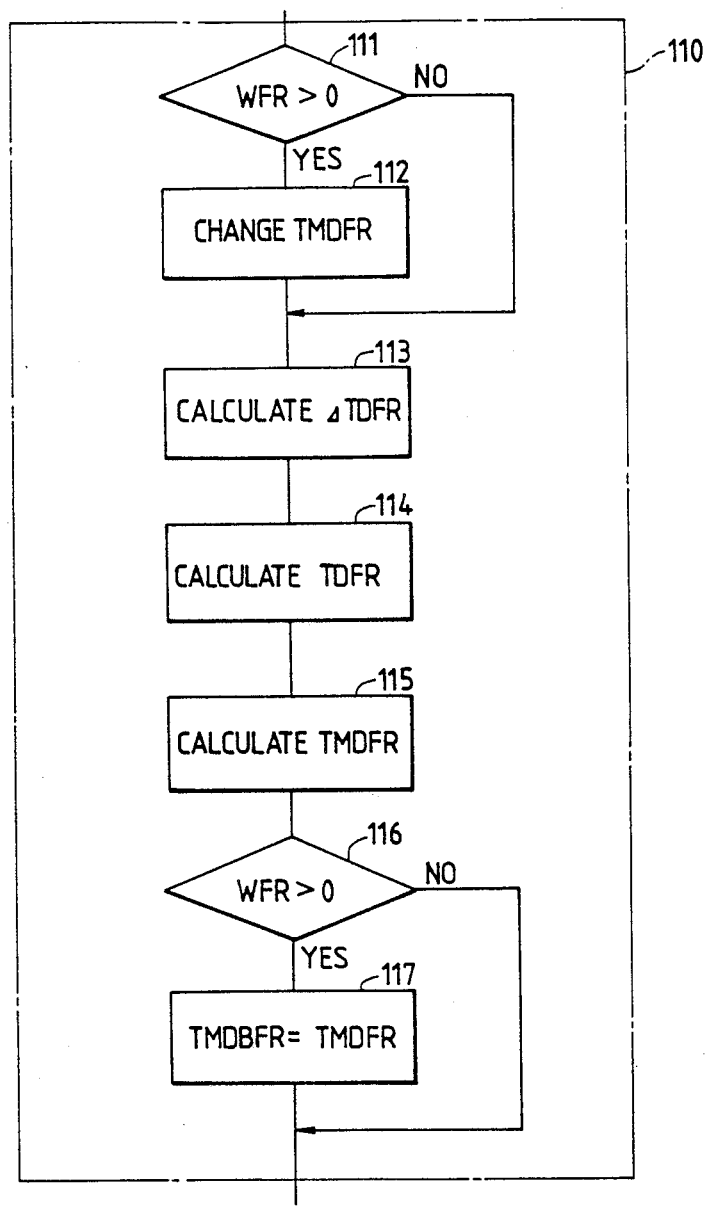
FIG. 10 is a flow chart of an operation executed in the step 110 of the FIG. 4 flow chart.

FIG. 10 is a flow chart showing one example of control for the front-right wheel to be executed in the step 110 of FIG. 4. This control starts with a step 111 to check whether the wheel parameter $W_{FR}$ is positive or negative. If the wheel parameter $W_{FR}$ is below zero, control goes to a step 113. On the other hand, if above zero, control goes to a step 112. In the step 112, the change of the balanced duty ratio $T_{MDFR(n-1)}$ to be used in after-mentioned steps 114 and 115 is performed by the following equation.

$$T_{MDFR(n-1)} = MIN(T_{MDFR(n-1)}, T_{MDBFR} + \Delta T_{MDOS}) \quad (q)$$

where operator MIN means that the smaller one of $T_{MDFR(n-1)}$, $T_{MDBFR} + \Delta T_{MDOS}$ is selected. That is, in the step 112, at the time of the start of re-increasing the pressure, the balanced duty ratio is changed to $T_{MDBFR} + \Delta T_{MDOS}$, and at the time of the pressure-increasing, it is changed to $T_{MDFR(n-1)}$ obtained previously in the step 115. However, even at the time of the start of pressure-reincreasing, when the balanced duty ratio $T_{MDFR(n-1)}$ calculated previously in the step 115 is smaller than the sum of the balanced duty ratio $T_{MDBFR}$ immediately before the start of the pressure-increasing and the offset amount $\Delta T_{MDOS}$, $T_{MDFR(n-1)}$ is used as the balanced duty ratio.

In the step 113, the variation $\Delta T_{DFR}$ of the duty ratio $T_{DFR}$ is obtained as follows using the wheel parameter $W_{FR}$ in accordance with the above-mentioned equation (m).

$$\Delta T_{DFR} = k3 \cdot W_{FR} \text{ ($k3$ is a positive constant)} \quad (r)$$

In the step 114, the duty ratio $T_{DFR}$ is attained as follows in accordance with the above-mentioned equation (o).

$$T_{DFR} = T_{MDFR(n-1)} - \Delta T_{DFR} \quad (s)$$

In the step 115, the balanced duty ratio $T_{MDFR(n)}$ to be used in the next calculation is obtained as follows in accordance with the equation (p).

$$T_{MDFR(n)} = T_{MDFR(n-1)} - k \cdot \Delta T_{DFR} \quad (t)$$

Thereafter, control goes to a step 116 to check whether the wheel parameter $W_{FR}$ is positive or negative. If the wheel parameter $W_{FR}$ is below zero, control goes to a step 120. On the other hand, if above zero, control goes to a step 117. In the step 117, the balanced duty ratio $T_{MDBFR}$ immediately before the start of the pressure-decreasing is updated. That is, with the steps 116 and 117, $T_{MDBFR}$ is updated at the time of the pressure-increasing, and at the time of pressure-decreasing or pressure-maintaining, $T_{MDBFR}$ is not varied so that $T_{MDBFR}$ becomes the balanced duty ratio immediately before the start of the pressure-decreasing.

The similar process is performed for the other wheels 2 to 4 in the steps 120, 130 and 140 of the flow chart of FIG. 4, respectively.

Figure 11A:
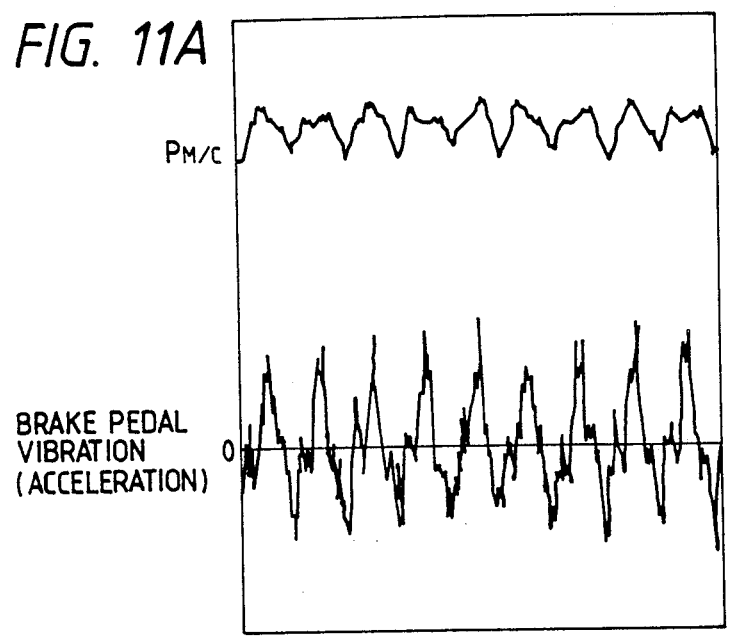
FIG. 11A shows experiment data in the case that the phases of the duty control for the respective solenoid-operated valves are the same.
Figure 11B:
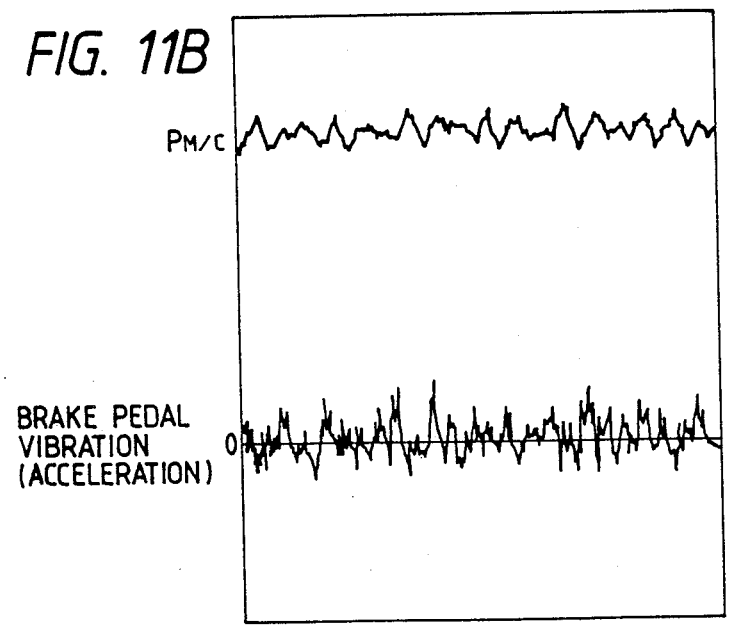
FIG. 11B shows experiment data in the case that the phases for the respective solenoid-operated valves are shifted from each other.
Figure 12:
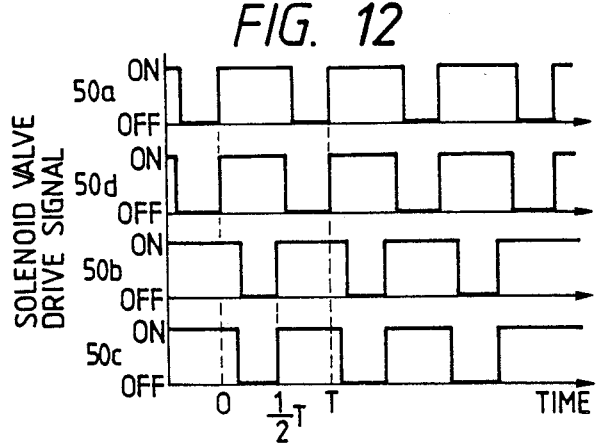
FIG. 12 is a timing chart for describing another duty control.

As described above with reference to FIG. 6, in these embodiments, the phases of the duty control for the solenoid-operated valves 50a to 50d are shifted by $\frac{1}{4}T$ from each other. FIGS. 11A and 11B show the experiment data. Here, the variation of the braking pressure Pm/c of the master cylinder 15 and the magnitude (vibration) of the kickback during the anti-locking control are expressed by acceleration and the cycle T of the duty control is set to be 32 msec. FIG. 11A shows the data in the case that the phases of the duty control for the solenoid-operated valves 50a to 50d are the same ·and FIG. 11B shows the data in the case that the phases thereof are shifted by $\frac{1}{4}T$ from each other. In cases where the duty control is employed for an anti-skid control system of the type that during the anti-skid control execution the pressure-increasing in the wheel braking cylinder is performed by supplying the braking liquid from the master cylinder to the wheel braking cylinder, when the phases of the duty control for the respective wheels are the same, as shown in FIG. 11A, the variation of the master cylinder pressure Pm/c becomes great so as to increase the kickback to the braking pedal and so on, thereby causing a problem that the driving feeling is deteriorated. On the other hand, in the case that the phases are shifted from each other, as illustrated in FIG. 11B, the variation of the master cylinder pressure Pm/c becomes smooth, thereby allowing reduction of the kickback to the braking pedal, vehicle vibration, control noises and so on. Here, it is also appropriate that the phases are divided into two groups which are arranged to be shifted in phase by $\frac{1}{2}T$ from each other as shown in FIG. 12.

Figure 5:
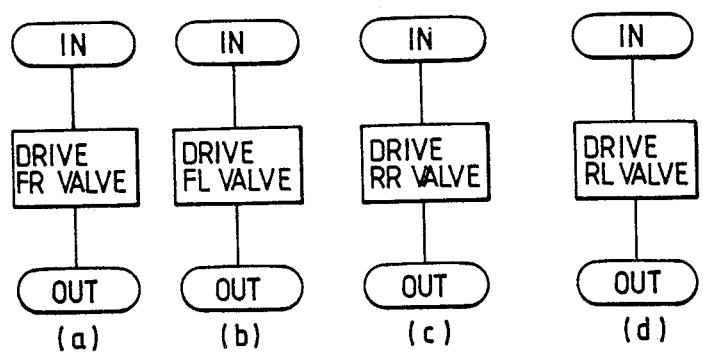
Figure 6:
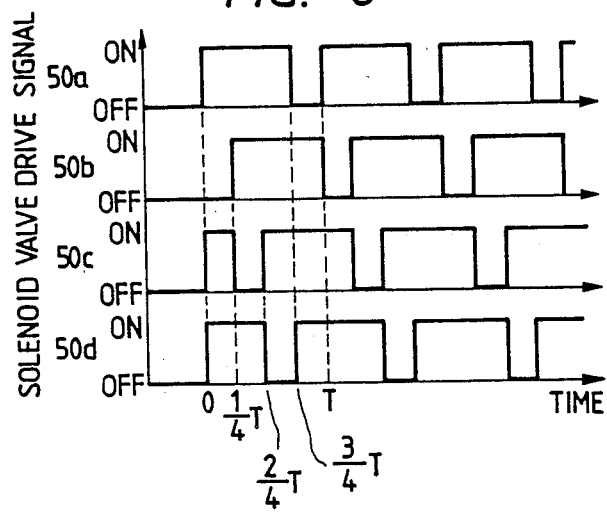
FIG. 6 is a time chart for describing the duty control of the anti-skid control of the first embodiment.
Figure 13:
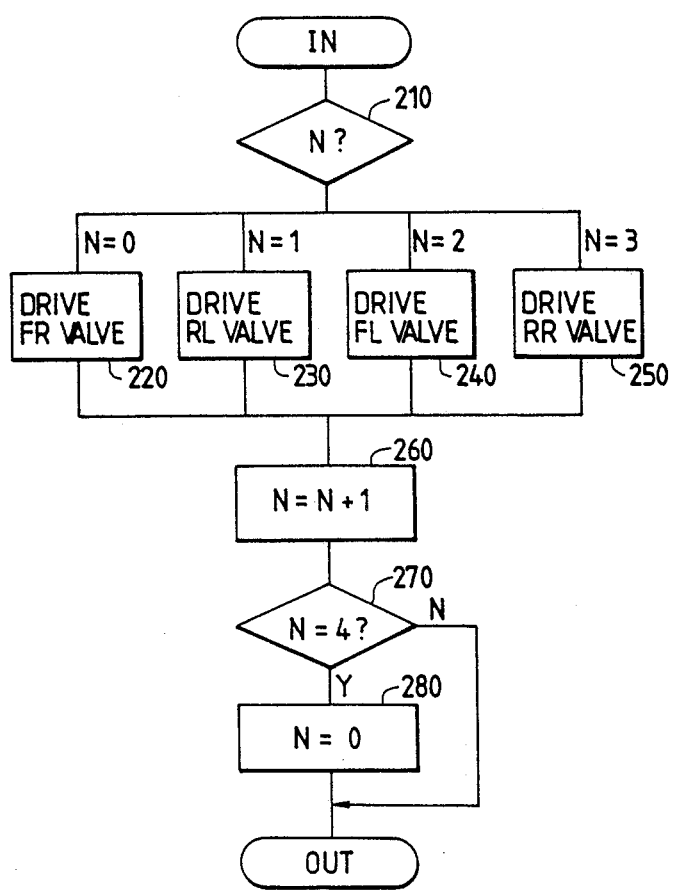
FIG. 13 is a flow chart of an operation for executing duty control.

Furthermore, although in the above-mentioned embodiments the duty control for the respective solenoid-operated valves 50a to 50d is effected in accordance with the interrupt routine shown in FIG. 5, the process can be performed in accordance with an interrupt routine as shown in FIG. 13. The interrupt routine of FIG. 13 is executed at every 8 msec and starts with a step 210 to check the value of a counter N. Thereafter, control goes to other steps in accordance with the value of the counter N. That is, if N=0, control goes to a step 220, if N=1, control advances to a step 320, if N=2, control proceeds to a step 240, and if N=3, control goes to a step 250. For example, in the step 220, for operating the two-position valve for the front-right wheel 1, a signal is outputted so as to set the two-position valve energization time of the cycle T to the timer. In steps 260 to 280, the counter is increment and when N=4, the counter N is set to 0.

Figure 14:
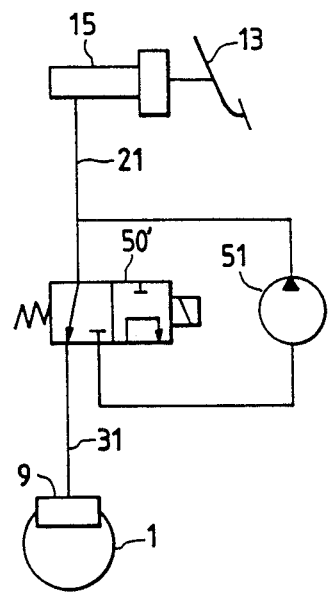
FIG. 14 shows another arrangement of the solenoid-operated valve which is usable in the anti-skid control system of this invention.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the embodiments the solenoid-operated valve is of the two-port and two-position type, it is also appropriate to use a three-port and two-position type solenoid-operated valve as shown in FIG. 14. Further, it is also appropriate to use an analog valve which can take continuously the position between the pressure-increasing position and the pressure-decreasing position. In this case, the analog valve should be driven by the current control or the duty control in which the period is very short. In the case that the analog valve is driven in accordance with the duty control in which the period is very short, the valve body of the analog valve is not moved for the duty control period but moved in accordance with the average value of the driving current due to the duty control. In addition, in the case that the analog valve is driven with the current control, the current I is obtained by the following equations.

$$I = I_{M(n-1)} - \Delta I \quad (u)$$

$$I_{M(n)} = I_{M(n-1)} - k \cdot \Delta I \quad (v)$$

Here, the aforementioned equations (u) and (v) respectively correspond to the equations (o) and (p), and the other processes are similar to the above-mentioned embodiments.

Furthermore, although in the step 112 of the FIG. 10 flow chart a constant is used for the offset amount $\Delta T_{MDOS}$ in the equation (g), it is appropriate to vary it in accordance with the pressure-decreasing time before start of the pressure-reincreasing.

What is claimed is:

1. An anti-skid control system for use in a motor vehicle, comprising:
   wheel speed detection means for detecting a speed of a wheel of said motor vehicle;
   control valve means for controlling the pressure in a wheel braking cylinder for applying a braking force to said wheel; and
   electronic control means including:
   locking state decision means for determining a locking state of said wheel on the basis of the wheel speed detected by said wheel speed detection means;
   balanced drive signal value estimating means for estimating a balanced drive signal value of said control valve means to maintain the present braking pressure therein;

drive signal value calculation means for calculating a drive signal value to said control valve means on the basis of the balanced drive signal value estimated by said balanced drive signal value estimating means in accordance with the wheel locking state determined by said locking state decision means; and drive control means for driving said control valve means in accordance with the drive signal value calculated by said drive signal value calculation means.

2. A system as claimed in claim 1, wherein the balanced drive signal value estimated by said balanced drive signal estimating means is changed as a function of the balanced drive signal value immediately before a start of decrease in the braking pressure at the time of a start of reincrease in the braking pressure after termination of decrease in the braking pressure.

3. A system as claimed in claim 2, wherein said balanced drive signal value at the time of a start of the pressure-reincreasing is set as the sum of said balanced drive signal value immediately before the pressure-decreasing and an offset amount.

4. An anti-skid control system for use in a motor vehicle, comprising:

wheel speed detection means for detecting a speed of a wheel of said motor vehicle;

control valve means for controlling the pressure in a wheel braking cylinder for applying a braking force to said wheel, said control valve means is of a two-position type having a pressure-increasing position and a pressure-decreasing position; and electronic control means including:

locking state decision means for determining a locking state of said wheel on the basis of the wheel speed detected by said wheel speed detection means;

balanced duty ratio estimating means for estimating a balanced duty ratio of said control valve means to maintain the present braking pressure therein;

duty ratio calculation means for calculating a duty ratio to said control valve means on the basis of the balanced duty ratio estimated by said balanced duty ratio estimating means in accordance with the wheel locking state determined by said locking state decision means; and drive control means for driving said control valve means in accordance with the duty ratio calculated by said duty ratio calculation means, said duty ratio determining the driving time relation between the pressure-increasing and pressure-decreasing of said control valve means.

5. A system as claimed in claim 4, wherein said locking state decision means determines the wheel locking state in accordance with a wheel parameter obtained on the basis of the detected wheel speed.

6. A system as claimed in claim 5, wherein said wheel parameter $W_{**}$ is obtained in accordance with the following equation:

$$W_{} = A \cdot (V_{} - V_{SH}) + B \cdot (\dot{V}_{**} - \dot{V}_B)$$

where $V_{}$ represents the wheel speed, $V_{SH}$ designates a reference speed, $\dot{V}_{}$ depicts a wheel acceleration, $\dot{V}_B$ denotes a vehicle acceleration, and A, B are constants.

7. A system as claimed in claim 6, wherein said duty ratio $T_{D}$ is calculated on the basis of said balanced duty ratio $T_{MD}$ in accordance with the following equation:

$$T_{D} = T_{MD} - \Delta T_{D**}$$

where $\Delta T_{D}$ represents variation of said duty ratio and $T_{MD}$ designates balanced duty ratio.

8. A system as claimed in claim 7, wherein said balanced duty ratio $T_{MD(n)}$ is estimated on the basis of the variation of said duty ratio in accordance with the following equation:

$$T_{MD(n)} = T_{MD(n-1)} - k \Delta T_D$$

where $T_{MD(n-1)}$ represents the previously calculated balanced duty ratio, k designates a constant, and $\Delta T_D$ is the variation of the duty ratio.

9. A system as claimed in claim 7, wherein the variation of said duty ratio is obtained on the basis of the obtained wheel parameter.

10. A system as claimed in claim 8, wherein the variation of said duty ratio is obtained on the basis of the obtained wheel parameter.

11. A system as claimed in claim 8, wherein said balanced duty ratio at the time of a start of the pressure-reincreasing is set as the sum of said balanced duty ratio immediately before the pressure-decreasing and an offset amount.

12. A system as claimed in claim 4, wherein the inlet side and the outlet side of said control valve means are communicated through pump means with each other and said control valve means is duty-controlled during the anti-skid control with said pump being always driven.

13. An anti-skid control system for use in a motor vehicle, comprising:

wheel speed detection means for detecting a speed of each of wheels of said motor vehicle;

control valve means for controlling the pressure in a wheel braking cylinder for applying a braking force to each of said wheels, said control valve means is of a two-position type having a pressure-increasing position and a pressure-decreasing position; and electronic control means including:

locking state decision means for determining a locking state of each of said wheels on the basis of the wheel speed detected by said wheel speed detection means;

balanced duty ratio estimating means for estimating a balanced duty ratio of said control valve means to maintain the present braking pressure therein;

duty ratio calculation means for calculating a duty ratio to said control valve means on the basis of the balanced duty ratio estimated by said balanced duty ratio estimating means in accordance with the wheel locking state determined by said locking state decision means; and drive control means for driving said control valve means in accordance with the duty ratio calculated by said duty ratio calculation means so that the phase of the duty drive cycle for at least one wheel is shifted from the phases of the duty drive cycle for the other wheels of said motor vehicle.

* * * * *